US012647936B2

(12) United States Patent
Mouilleron et al.

(10) Patent No.: US 12,647,936 B2
(45) Date of Patent: Jun. 2, 2026

(54) METHOD OF LOCATING AN OBJECT

(71) Applicant: ORANGE, Issy-les-Moulineaux (FR)

(72) Inventors: Marc-Antoine Mouilleron, Chatillon Cedex (FR); Dinh Thuy Phan Huy, Chatillon Cedex (FR); Zwi Altman, Chatillon Cedex (FR); Philippe Legay, Chatillon Cedex (FR)

(73) Assignee: ORANGE, Issy-les-moulineaux (FR)

( * ) Notice: Subject to any disclaimer, the term of this patent is extended or adjusted under 35 U.S.C. 154(b) by 479 days.

(21) Appl. No.: 18/044,279

(22) PCT Filed: Sep. 7, 2021

(86) PCT No.: PCT/FR2021/051532
§ 371 (c)(1),
(2) Date: Mar. 7, 2023

(87) PCT Pub. No.: WO2022/053758
PCT Pub. Date: Mar. 17, 2022

(65) Prior Publication Data
US 2023/0337178 A1      Oct. 19, 2023

(30) Foreign Application Priority Data

Sep. 9, 2020    (FR) ........................................ 2009134
Oct. 15, 2020    (FR) ........................................ 2010551

(51) Int. Cl.
*H04W 64/00*          (2009.01)
(52) U.S. Cl.
CPC ................................. *H04W 64/006* (2013.01)
(58) Field of Classification Search
None
See application file for complete search history.

(56) References Cited

U.S. PATENT DOCUMENTS

2003/0191767 A1* 10/2003 Kabala .................. G06K 7/0008
2012/0319819 A1* 12/2012 Tkachenko ........... G01S 13/878
                                                                340/10.1

FOREIGN PATENT DOCUMENTS

| CN | 107861100 A | 3/2018 |
| WO | 2014153516 A1 | 9/2014 |
| WO | 2016010653 A1 | 1/2016 |

OTHER PUBLICATIONS

Wang Jun et al., "An indoor localization system based on backscatter RFID tag", 2016 IEEE Wireless Communications and Networking Conference, IEEE, Apr. 3, 2016 (Apr. 3, 2016), p. 1-6, XP032959411.

(Continued)

*Primary Examiner* — Frantz Bataille
(74) *Attorney, Agent, or Firm* — David D. Brush; Westman, Champlin & Koehler, P.A.

(57)          ABSTRACT

A method for locating an object includes: obtaining at least one item of identification data of at least one object, the item of identification data coming from a backscattering of at least one ambient signal; and if the at least one ambient signal is transmitted following at least one uplink between at least one transmitter device and at least one receiver device, determining a location of the object from the item of identification data and at least one item of location data of the at least one transmitter device; or, if the at least one ambient signal is transmitted following at least one downlink between at least one transmitter device and at least one receiver device, determining a location of the at least one object from the item of identification data and at least one item of location data of the at least one receiver device.

20 Claims, 7 Drawing Sheets

(56) References Cited

OTHER PUBLICATIONS

Rachedi K et al., "Demo Abstract: Real-Time Ambient Backscatter Demonstration", IEEE INFOCOM 2019—IEEE Conference on Computer Communications Workshops (INFOCOM WKSHPS), IEEE, Apr. 29, 2019 (Apr. 29, 2019), p. 987-988, XP033619535.

International Search Report dated Jan. 12, 2022 for corresponding International Application No. PCT/FR2021/051532, filed Sep. 7, 2021.

Written Opinion of the International Searching Authority dated Jan. 12, 2022 for corresponding International Application No. PCT/FR2021/051532, filed Sep. 7, 2021.

English translation of the Written Opinion of the International Searching Authority dated Jan. 12, 2022 for corresponding International Application No. PCT/FR2021/051532, filed Sep. 7, 2021.

Nguyen Van Huynh, et al., "Ambient Backscatter Communications: A Contemporary Survey", IEEE Communications Surveys & Tutorials, vol. 20, No. 4, Fourth Quarter 2018, pp. 2889-2922, Fourth Quarter 2018.

T. Keller, et al., "Using low-level reader data to detect false-positive RFID tag reads," 2010 Internet of Things (IOT), Tokyo, 2010, pp. 1-8.

Azeddine Gati, et al., "Key technologies to accelerate the ICT Green evolution—An operator's point of view," arXiv:1903.09627v1 [cs. NI] Mar. 22, 2019, available at: https://arxiv.org/abs/1903.09627.

Webpage, "Traceability: analysis of the forms of traceability and the techniques used," Research, Information, Studies & Advice, Retrieved from the Internet: http://www.logistiqueconseil.org/Articles/Logistique/Techniques-tracabilite.htm, At least as early as Sep. 9, 2020.

EPCIS Standard "Enables disparate applications to create and share visibility event data, both within and across enterprises," GS1, Release 2.0, Ratified, Jun. 2022.

GS1 Standard Webpage, "GS1 identification keys," Retrieved from the Internet: https://www.gs1.org/standards/id-keys, at least as early as Sep. 9, 2020.

Webpage, "Introducing UN/EDIFACT," Unece. (n.d.)., Retrieved from the Internet: https://unece.org/trade/uncefact/introducing-unedifact, at least as early as Sep. 9, 2020.

Webpage, "RFID Industrial Gate," Product by Panoptès, 2023, Retrieved from the Internet: https://www.linkedin.com/products/panoptesfrance-portique-industriel-rfid/?trk=organization_guest_product_card_related-content-card.

Rachedi, K. et al., "Demo Abstract : Real-Time Ambient Backscatter Demonstration," in Proc. IEEE INFOCOM'19 Demo Session, Apr. 29-May 2, 2019, Paris, France, hal-02185131.

Peral-Rosado, J. et al., "Achievable localization accuracy of the positioning reference signal of 3GPP LTE," 2012 International Conference on Localization and GNSS, Starnberg, 2012, pp. 1-6, doi: 10.1109/ICL-GNSS.2012.6253127.

* cited by examiner

[Fig. 1]
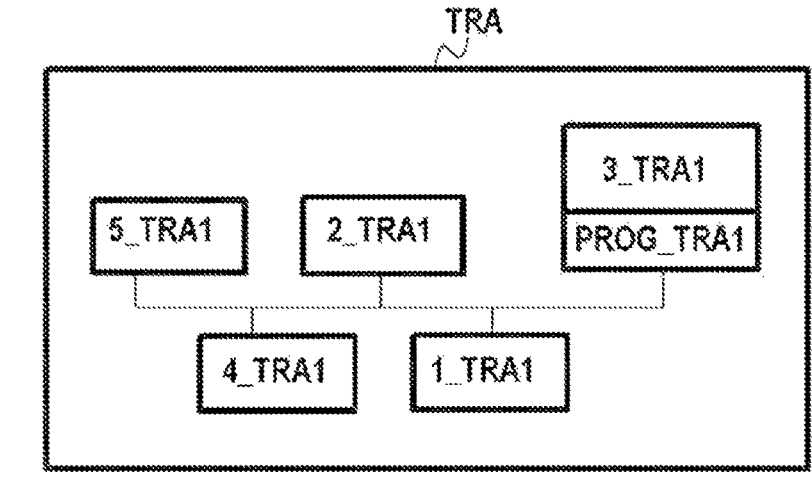
[Fig. 2]
TRA
[Fig. 3]
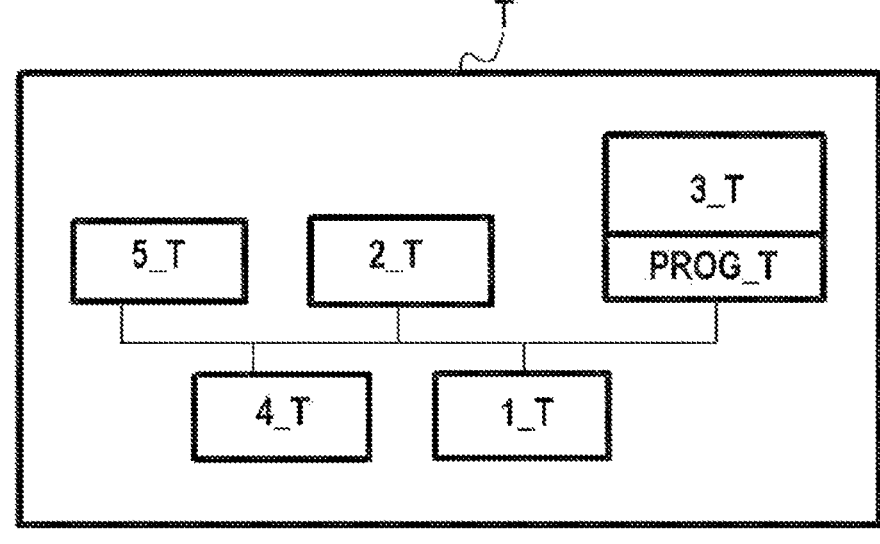

[Fig. 4]
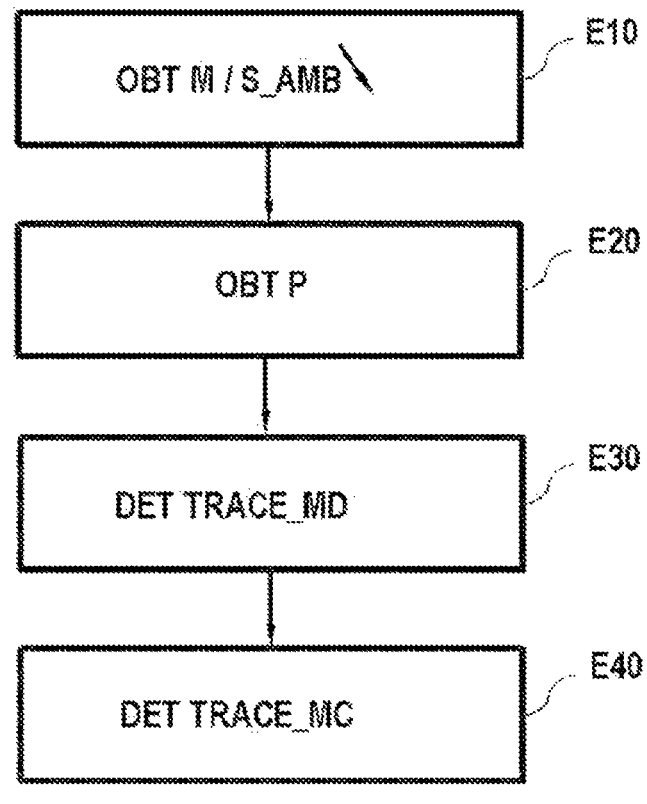
[Fig. 5]
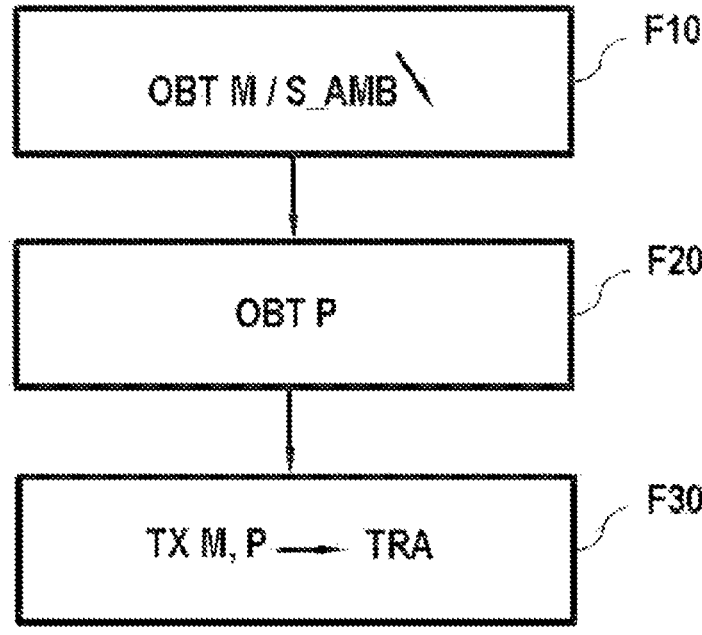

[Fig. 6]
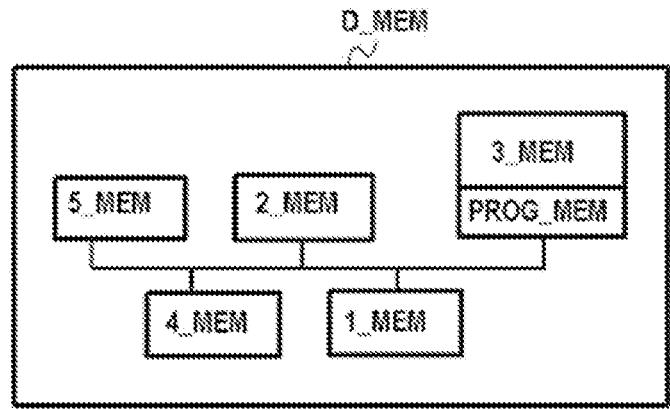
D_MEM
5_MEM    2_MEM    3_MEM
PROG_MEM
4_MEM    1_MEM
[Fig. 7]
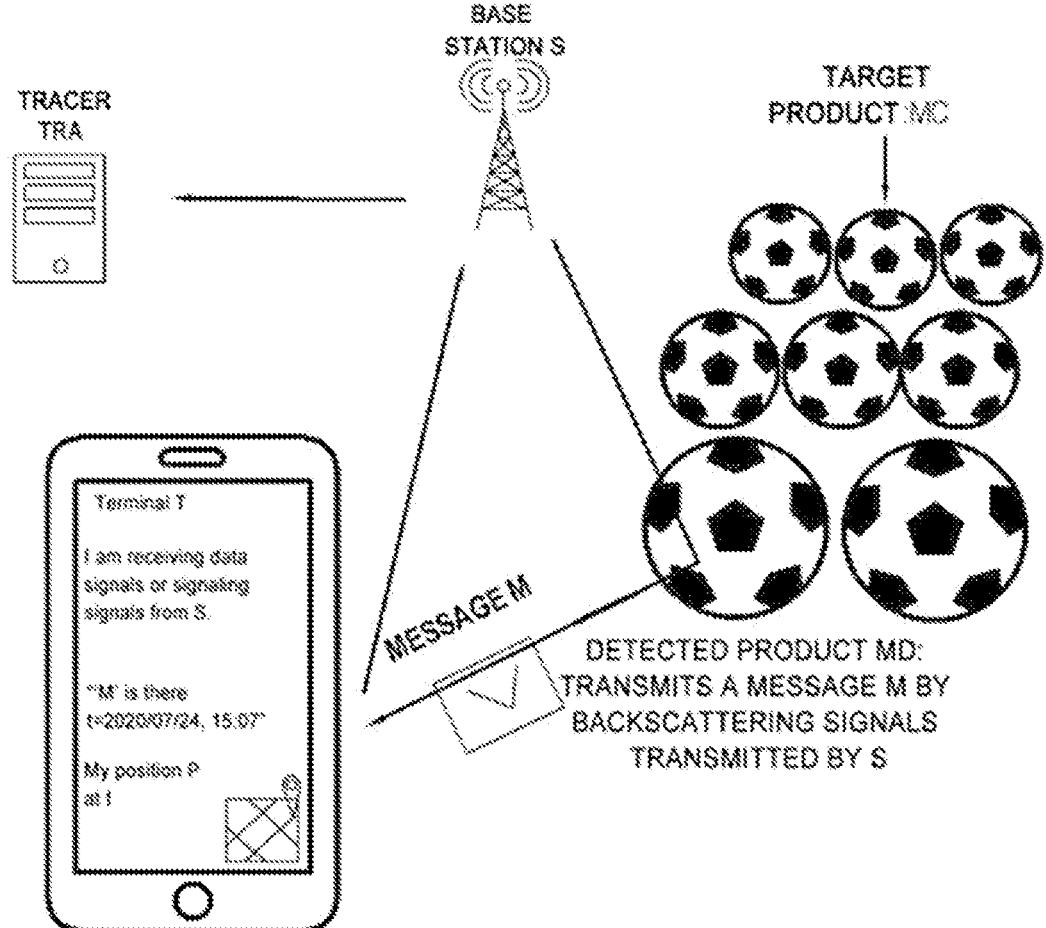
TRACER
TRA
BASE
STATION S
TARGET
PRODUCT MC
Terminal T
I am receiving data
signals or signaling
signals from S.
"M" is there
(t=2020/07/24, 15:07"
My position P
at t
MESSAGE M
DETECTED PRODUCT MD:
TRANSMITS A MESSAGE M BY
BACKSCATTERING SIGNALS
TRANSMITTED BY S

[Fig. 8]
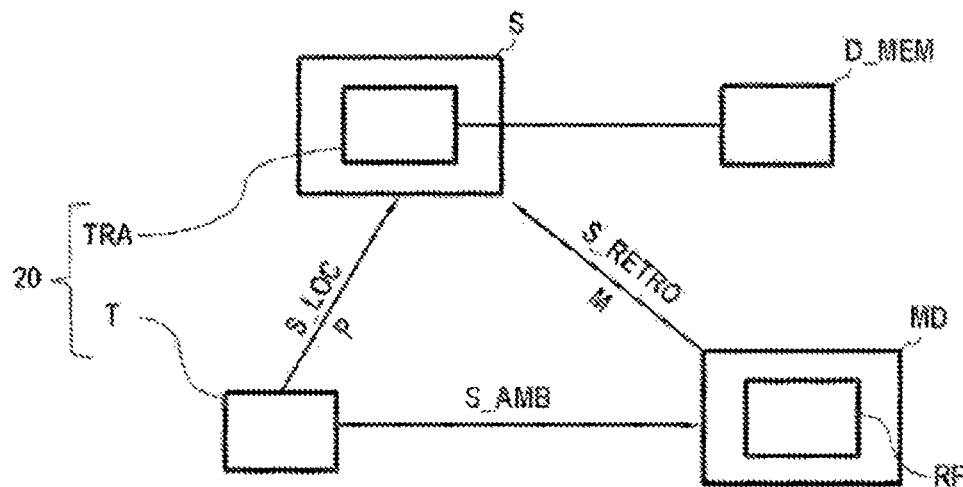
[Fig. 9]
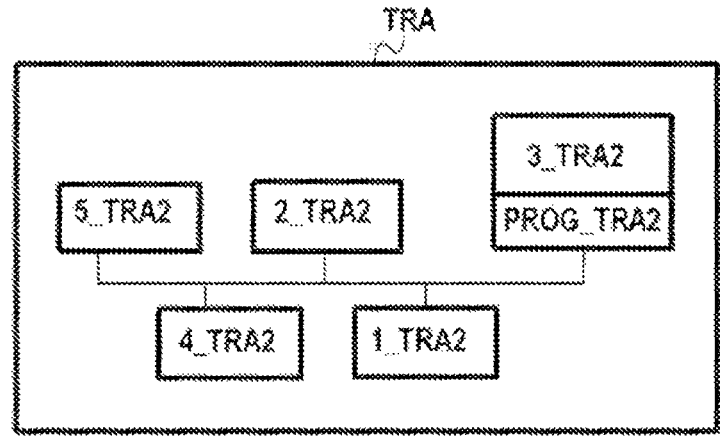
[Fig. 10]
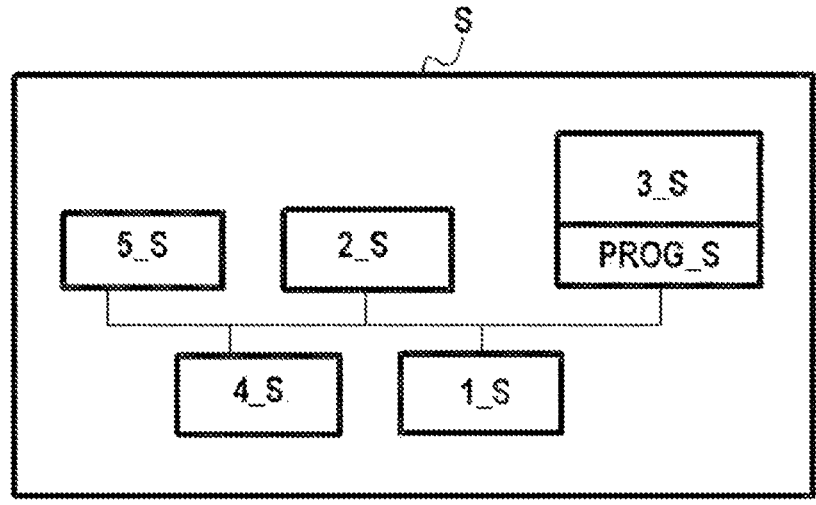

[Fig. 11]
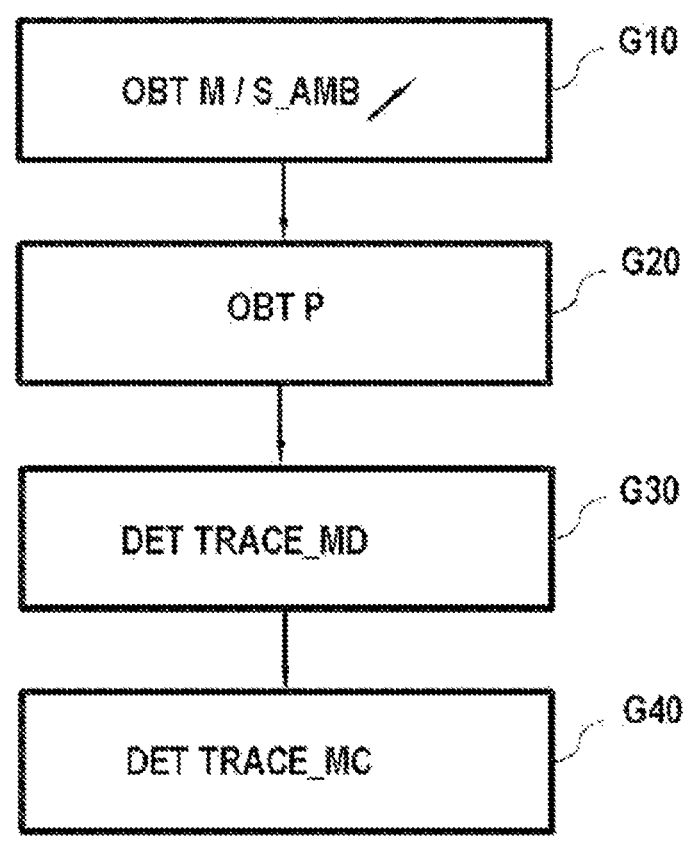
[Fig. 12]
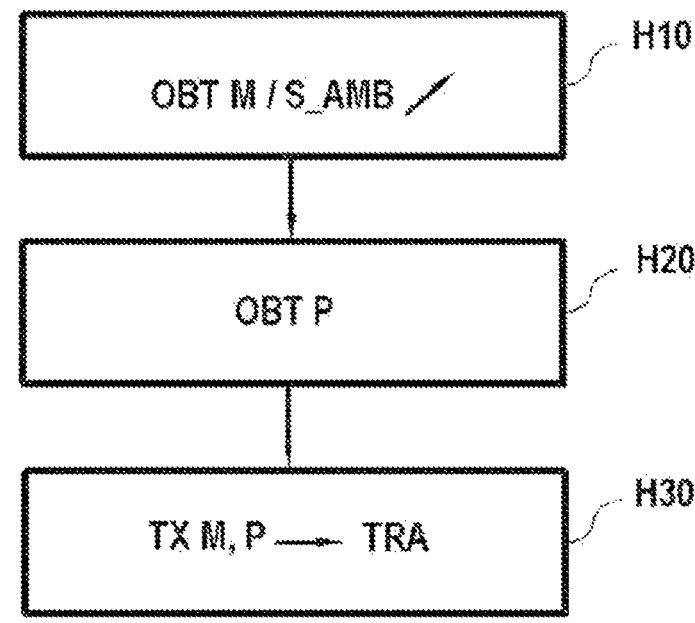

[Fig. 13 ]
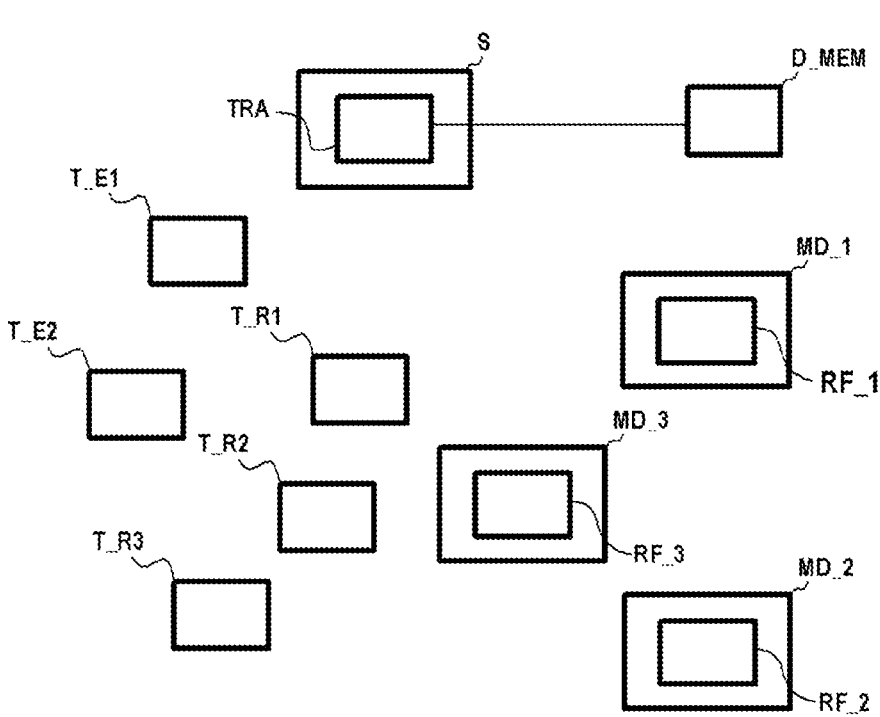

[Fig.14]
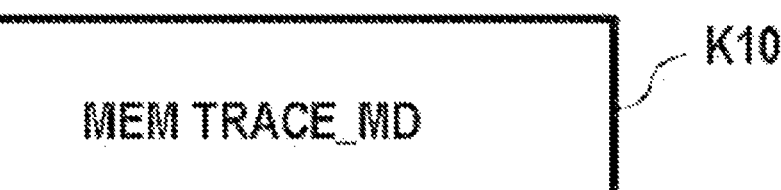

METHOD OF LOCATING AN OBJECT

CROSS-REFERENCE TO RELATED APPLICATIONS

This Application is a Section 371 National Stage Application of International Application No. PCT/FR2021/051532, filed Sep. 7, 2021, the content of which is incorporated herein by reference in its entirety, and published as WO 2022053758 on Mar. 17, 2022, not in English.

PRIOR ART

The invention lies in the field of locating objects. It relates in particular to a method for locating an object, to a communication method, to a data collection method and to a method for locating at least one other object using an object location determined by way of said method for locating an object. It also relates to devices configured to implement the mentioned methods. The invention may for example be applied to the traceability of one or more objects, in particular of objects that have been introduced into a distribution circuit as elements of a batch of objects.

The traceability of an object may include not only the activity of generating the information needed and sufficient to ascertain (possibly retrospectively) the life cycle of this object, but also the possibility of having access to this information. In yet other words, it involves the ability to generate and find, for example by way of a registered identification of an object, a history that records information relating to the use and the location of said object. Traceability thus makes it possible, in some situations, to help to track and therefore to find a product from creation (production) thereof to destruction (consumption) thereof, via transformation steps that it might have undergone and the routing thereof.

The effectiveness of the traceability of one or more objects thus depends on the ability to locate the one or more objects in question in space and/or in time. To this end, traceability has been able to benefit from advances linked to the development of IT and to electronic miniaturization so as to draw on contactless identification technologies.

Barcodes affixed to objects have thus been used and continue to be used today. These barcodes may be read using dedicated means equipped with optical readers, and carry information for identifying the objects with which they are respectively associated.

Another solution that is also widely used consists in using electronic chips, also called radio tags, based on RFID (acronym for "Radiofrequency Identification") technology and affixed to objects that are intended to be traced. RFID technology has certain advantages, including in particular that it is passive (that is to say the chip does not need to be connected to an energy source to operate), but also that the information contained in such a chip is able to be read over a greater distance than that able to be contemplated in the case of using barcodes.

The fact still remains that these object-locating techniques have certain use limits. Indeed, they require having to deploy dedicated and expensive hardware. Thus, and as was mentioned above, reading barcodes requires using devices equipped with optical readers. RFID chips also require the use of dedicated reading devices, for example in the form of portable RFID readers or else in the form of gates, which may be heavy and complex to install.

SUMMARY OF THE INVENTION

The present invention aims to rectify all or some of the drawbacks of the prior art, for example at least some of those set out above. For example, certain embodiments of the present invention may propose a solution that makes it possible to locate one or more objects more efficiently (in terms for example of ease of implementation, cost and/or energy consumption) than certain solutions from the prior art. Such a solution may also, in certain embodiments, help to locate objects outside of any logistics circuit, thus extending the scope of application within which the traceability of objects is traditionally implemented.

To this end, and according to a first aspect, the invention relates to a method for locating an object. Said locating method comprises the following steps:

obtaining at least one identification datum of at least one object, said at least one identification datum resulting from the backscatter of at least one ambient signal, if said at least one ambient signal is transmitted on at least one uplink between at least one transmitter device and at least one receiver device, determining a location of said at least one object based on said at least one identification datum and at least one location datum of said at least one transmitter device, or if said at least one ambient signal is transmitted on at least one downlink between at least one transmitter device and at least one receiver device, determining a location of said at least one object based on said at least one identification datum and at least one location datum of said at least one receiver device.

The locating method according to the invention is therefore based on the fact that one or more identification data respectively associated with one or more objects may be generated by an ambient backscatter communication technology.

The use of this backscatter technology does not require the deployment of particular hardware elements in order to be implemented, except for one or more transmitter devices able to backscatter one or more ambient signals so as to generate data (for example said identification data), and may therefore be readily adapted to certain embodiments of the invention.

Indeed, the one or more ambient signals may be transmitted by hardware elements present in the environment of the objects (cell phone, base stations, etc.), or by hardware elements implementing certain embodiments of the invention. In the same way, the identification data generated by ambient backscatter may also be collected by hardware elements present in the environment of the objects (cell phone, base stations, etc.), for example off-the-shelf hardware elements, or hardware elements implementing certain embodiments of the invention.

Additionally, in certain embodiments, the location data may also be generated and/or collected by hardware elements present in the environment of the objects.

Certain embodiments of the invention may therefore help to provide advantages in terms of saving on hardware insofar as they may be based at least partially on information obtained using hardware already available in the environment of the objects. Consequently, certain embodiments of the invention may therefore help to avoid, or in any case to limit, the use of a workforce dedicated to locating one or more objects. In particular, some of the abovementioned hardware elements, present in the environment of the objects, may belong to any users.

Added to this is the fact that ambient backscatter communication technology is a technology that is energy-efficient and easy to deploy.

Owing for example to the abovementioned features (potential saving on hardware and workforce), certain embodiments of the invention may help to extend the detection, locating and traceability of one or more objects beyond the field of logistics, and therefore beyond any logistics process.

"Logistics process" refers here to all manipulations of objects and changes of owners or managers of these objects. Such a logistics process may for example make it possible to generate, using the identifications respectively attached to the objects, a history of traceability events, which may be stored in one or more information systems, such as for example a server acting as a database dedicated to this purpose. This history may help to retrace the movements of the objects over their life cycle during the logistics process, for example following successive identifications during steps of production, storage, order preparation and/or grouping together with other objects (such as for example objects of the same kind grouped together in the form of batches), shipping, delivery with the objects being ungrouped, etc.

It is possible for example to imagine the case of a first product acting as object within the sense of the invention, this first product being marketed at a point of sale. This first product, which is now on sale, has therefore left the field of logistics. Nevertheless, by placing a transmitter device (or "tag") on this first product such that an identification datum of this first product is able to be generated by ambient backscatter, it is possible to locate said first product by way of certain embodiments of the invention.

For example, a smartphone belonging to a potential buyer of other products present at the point of sale may receive, in addition to an ambient signal transmitted by a base station, said identification datum of the first product and transmit it to a device configured to determine a location of the first product on the basis of said identification datum of the first product and a location datum of said smartphone.

According to another example, the smartphone may be the source of the ambient signal from which the identification datum of the first product is generated by ambient backscatter. Again, the location of the first product may be determined using a device configured for this purpose and in possession of said identification datum of the first product and a location datum of said smartphone. In this example, certain embodiments may be implemented without requiring implementation of the invention in the smartphone at the source of the ambient signal.

Thus, certain embodiments of the locating method of the present invention may therefore, unlike certain solutions from the prior art, make it possible to locate one or more objects without it being necessary to resort to actions (gestures) performed specifically and deliberately by operators trained for this purpose. It also becomes apparent from these considerations that the locating of objects, with the aim of providing traceability thereof, may be extended, in certain embodiments, outside the conventional circuits of the field of logistics (production, storage, order preparation, grouping together of products, shipping, delivery, etc.). In this way, certain embodiments of the locating method of the present invention may help to locate an object once it leaves the field of logistics, for example following a purchase at a distribution point, and thus help to ensure traceability thereof.

Certain embodiments of the locating method according to the invention may also differ from the prior art in that an object may be located at least partially non-deliberately (that is to say an object might not be subject to a targeted search, and is detected "by chance").

Indeed, and first of all, the transmission of a location datum (by a receiver device in the case of a downlink or by a transmitter device in the case of an uplink) is not necessarily correlated with the reception of an identification datum (by a receiver device in the case of a downlink) or with the transmission of an ambient signal (by a transmitter device in the case of an uplink). For example, the transmission of a location datum may result from the implementation of a transmission protocol unrelated to the reception of an identification datum of an object or to the transmission of an ambient signal.

Second of all, the decoding of a backscattered signal (by a receiver device, whether the link is an uplink or a downlink) in order to ascertain an identification datum of an object is not necessarily activated as soon as an ambient signal is backscattered. By way of completely non-limiting example, and in the case of a downlink, a user in possession of a smartphone may decide, as he/she wishes, to activate an operating mode of said smartphone that allows it to receive and decode a possible backscattered ambient signal. This same user may also decide to activate said operating mode if a recommendation message to this effect is transmitted to him/her (for example if attempting to locate contaminated products from a given batch within a given geographical area).

In certain embodiments of the invention, the locating method may furthermore comprise one or more of the following features, taken on their own or in any technically possible combination.

In certain embodiments of the invention, a single location datum is obtained, determining a location of said at least one object comprising associating the identification datum of said at least one object with said location datum.

In certain embodiments of the invention, a plurality of first location data (P) is obtained, said first location data having been transmitted by one or more transmitter devices (T) if said at least one ambient signal (S_AMB) is transmitted on at least one uplink or else by one or more receiver devices (T) if said at least one ambient signal (S_AMB) is transmitted on at least one downlink, determining (E30, G30) a location (TRACE_MD) of said at least one object (MD) comprising:

associating the identification datum of said at least one object with a second location datum obtained based on said plurality of first location data.

In certain embodiments of the invention, the second location datum is determined through triangulation between the first location data.

In certain embodiments of the invention, a plurality of location data is obtained, said location data having been transmitted by one or more transmitter devices if said at least one ambient signal is transmitted on at least one uplink or else by one or more receiver devices if said at least one ambient signal is transmitted on at least one downlink, determining a location of said at least one object (MD) comprising:

determining an adjusted location datum, based on said plurality of location data, associating the identification datum of said at least one object with said adjusted location datum.

In certain embodiments of the invention, the adjusted location datum is determined through triangulation between the location data.

In certain embodiments of the invention, the method comprises the following steps:

obtaining at least one first temporal datum representative of the time of backscattering of said at least one ambient signal, obtaining at least one second temporal datum representative of the time of generation of said at least one location datum, determining the location of said at least one object taking into account said first and second temporal data.

In some particular modes of implementation, determining the location of said at least one object takes into account a datum representative of a level of confidence in the accuracy of said location.

According to a second aspect, the invention relates to a communication method, implemented in a receiver device receiving a backscattered ambient signal. Said communication method comprises the following steps:

obtaining at least one identification datum of at least one object, said at least one identification datum resulting from the backscatter of said ambient signal, when said ambient signal is transmitted on a downlink between a transmitter device and a receiver device, transmitting said at least one identification datum of said at least one object and at least one location datum of said receiver device to an object-locating device;

when said ambient signal is transmitted on an uplink between a transmitter device and a receiver device, transmitting said at least one identification datum of said at least one object to an object-locating device.

In certain embodiments, said communication method furthermore comprises, when said ambient signal is transmitted on an uplink, a step of transmitting at least one location datum of said transmitter device to said object-locating device.

According to a third aspect, the invention relates to a data collection method. Said method comprises a step of storing at least one location determined for at least one object in accordance with an object-locating method according to the invention, said storage being performed using a non-transitory information or recording storage medium able to be read by a computer, such as for example one or computer, so as to create and/or enrich a location history of said at least one object.

According to a fourth aspect, the invention relates to a method for locating at least one object referred to as "other object". Said method for locating said at least one other object comprises the following steps:

obtaining a location of at least one object as determined in accordance with an object-locating method according to the invention, determining a location of said at least one other object taking into account a neighborhood of said at least one located object and of said at least one other object.

Such provisions may, in certain embodiments, help to locate one or more objects for which it might not be possible to obtain identification data.

Specifically, the invention proposes, in such modes of implementation, to attempt to compensate for this lack of information (absence of identification data on a given object) by determining whether there is a past and/or scheduled proximity (neighborhood) link between the objects in question.

In certain embodiments of the invention, the method for locating said at least one other object may furthermore comprise one or more of the following features, taken on their own or in any technically possible combination.

In certain embodiments of the invention, said neighborhood is a past and/or scheduled geographic proximity of said at least one located object and of said at least one other object.

In certain embodiments of the invention, said neighborhood is a past and/or scheduled geographic proximity of said at least one located object and of said at least one other object during a first time period.

According to a fifth aspect, the invention relates to a computer program comprising instructions for implementing an object-locating method according to the invention or a communication method according to the invention or a data collection method according to the invention or a method for locating at least one other object according to the invention when said computer program is executed by a computer.

This program may use any programming language and be in the form of source code, object code or intermediate code between source code and object code, such as in a partially compiled form, or in any other desirable form.

According to a sixth aspect, the invention relates to a computer-readable information medium or recording medium on which there is recorded a computer program according to the invention.

The information medium or recording medium may be any entity or device capable of storing the program. For example, the medium may comprise a storage means, such as a ROM, for example a CD-ROM or a microelectronic circuit ROM, a USB key or else a magnetic recording means, for example a floppy disk or a hard disk.

Moreover, the information medium or recording medium may be a transmissible medium such as an electrical or optical signal, which may be routed via an electrical or optical cable, by radio or by other means. The program according to the invention may in particular be downloaded from a network such as the Internet.

As an alternative, the information medium or recording medium may be an integrated circuit in which the program is incorporated, the circuit being designed to execute or to be used in the execution of the method in question.

According to a seventh aspect, the invention relates to an object-locating device comprising at least one processor configured to:

obtain at least one identification datum of at least one object, said at least one identification datum resulting from the backscatter of at least one ambient signal, when said at least one ambient signal is transmitted on at least one uplink between at least one transmitter device and at least one receiver device, determine a location of said at least one object based on said at least one identification datum and at least one location datum of said at least one transmitter device;

when said at least one ambient signal is transmitted on at least one downlink between at least one transmitter device and at least one receiver device, determine a location of said at least one object based on said at least one identification datum and at least one location datum of said at least one receiver device.

According to an eighth aspect, the invention relates to a communication device configured to receive a backscattered ambient signal and comprising at least one processor configured to:

obtain at least one identification datum of at least one object, said at least one identification datum resulting from the backscatter of said ambient signal, when said ambient signal is transmitted on a downlink between a transmitter device and a receiver device, transmit said at least one identification datum of said at least one object and at least one location datum of said receiver device to an object-locating device;

when said ambient signal is transmitted on an uplink between a transmitter device and a receiver device, transmit said at least one identification datum of said at least one object to an object-locating device.

According to a ninth aspect, the invention relates to a data collection device, said device comprising at least one processor configured to store at least one location determined for at least one object by a locating device according to the invention, said storage being performed using a non-transitory information or recording storage medium able to be read by a computer, such as for example one or more computer files, so as to create and/or enrich a location history of said at least one object.

According to a tenth aspect, the invention relates to a locating device for locating at least one object referred to as "other object" based on a location of at least one object as determined by a locating device according to the invention. Said locating device for locating said at least one other object comprises at least one processor configured to determine a location of said at least one other object taking into account a neighborhood of said at least one located object and of said at least one other object.

In certain embodiments of the invention, said locating, communication and/or collection device is an element from a group comprising at least:

a smartphone;
a mobile terminal;
a base station;
a server;
a network interconnection gateway.

BRIEF DESCRIPTION OF THE DRAWINGS

Other features and/or advantages of the present invention will become apparent from the description given below, with reference to the appended drawings that illustrate one exemplary embodiment thereof that is in no way limiting. In the figures:

FIG. 1 schematically shows, in its environment and according to certain embodiments of the invention, a system for locating an object, configured to implement backscatter on a downlink between a transmitter device and a receiver device;

FIG. 2 schematically shows one example of a hardware architecture of a locating device belonging to the locating system of FIG. 1;

FIG. 3 schematically shows one example of a hardware architecture of the receiver device of FIG. 1;

FIG. 4 shows, in the form of a flowchart, some steps of a locating method according to certain embodiments of the invention, such as they may be implemented by the locating device of FIG. 2;

FIG. 5 shows, in the form of a flowchart, some steps of a communication method according to certain embodiments of the invention, such as they may be implemented by the receiver device of FIG. 3;

FIG. 6 schematically shows one example of a hardware architecture of a data collection device possibly belonging, in certain embodiments, to the locating system of FIG. 1;

FIG. 7 schematically shows another exemplary embodiment of the system for locating an object, configured to implement backscatter on a downlink between a transmitter device and a receiver device, and in which a locating device for locating said object is external to the transmitter device;

FIG. 8 schematically shows, in its environment and according to certain embodiments of the invention, a system for locating an object, implementing backscatter on an uplink between a transmitter device and a receiver device;

FIG. 9 schematically shows one example of a hardware architecture of a locating device belonging to the locating system of FIG. 4;

FIG. 10 schematically shows one example of a hardware architecture of the receiver device of FIG. 8;

FIG. 11 shows, in the form of a flowchart, some steps of a locating method according to certain embodiments of the invention, such as they may be implemented by the locating device of FIG. 9;

FIG. 12 shows, in the form of a flowchart, some steps of a communication method according to certain embodiments of the invention, such as they may be implemented by the receiver device of FIG. 10;

FIG. 13 schematically shows, in its environment and according to certain embodiments of the invention, a system for locating an object, implementing backscatter on a downlink and backscatter on an uplink;

FIG. 14 shows, in the form of a flowchart, some steps of a data collection method according to certain embodiments of the invention, such as they may be implemented by the data collection device of FIG. 6.

DESCRIPTION OF THE EMBODIMENTS

The present invention falls within the scope of locating objects, for example products, in particular before and/or after they have traveled a logistics circuit, such as for example a distribution circuit. At least certain modes of implementation of the invention may for example help to extend the detection, the locating and the traceability of one or more objects, for example beyond said distribution circuit, in other words beyond the field of logistics, and therefore of any logistics process.

The traceability events recorded during a logistics process may include in particular the list of identified objects, the timestamp of the identification, the place of the identification, and the business step performed in the identification, such as for example an order preparation. These fields may also be supplemented by other ones, for example the intended recipient of the order.

The traceability events may for example be compatible with or use various standards, such as for example those provided by EDIFACT (acronym for "Electronic Data Interchange for Administration, Commerce and Transport"), those used by warehouse management system (WMS) software or business management ERP (acronym for "Enterprise Resource Planning") software, or even those provided by the GS1 group, such as for example the EPCIS (acronym for "Electronic Product Code Information Services") standard.

Moreover, within the sense of the present invention, the expression "beyond the field of logistics" refers to the fact that an object leaves the logistics circuit to which it was previously attached. Thus, when an object leaves the field of logistics, it may be situated in a place of distribution (this is the case for example when a product is delivered to a distribution point, such as for example a supermarket, and may therefore be purchased by a consumer), a place of consumption (for example a restaurant), a place intended for waste recovery, a place in a public space (such as for example a street), a place in a private personal space (such as for example a dwelling), etc.

In general, there is no limit attached to the place where an object capable of being located by way of certain embodiments of the present invention may be situated, specifically as soon as the object has left the field of logistics.

It may also be noted that certain embodiments of the invention may help to locate an object that has left the field of logistics (unlike certain solutions from the prior art), specifically without requiring the redeployment of a dedicated workforce that would act deliberately (identification and active locating).

In particular, certain embodiments of the present invention tend to propose a locating system that is easier to implement and less expensive than certain solutions from the prior art and that helps to passively locate one or more objects (the use of a workforce specially deployed to locate said one or more objects not being required).

For the rest of the description, and essentially for the purpose of simplifying it, consideration is given, in a completely non-limiting manner and unless indicated otherwise, to the case of locating a single object. It will furthermore be considered, by way of example, that said object corresponds to a product (for example a sporting item) positioned at a point of sale (for example a store dedicated to the sale of sports equipment).

The fact still remains that certain embodiments of the invention remain applicable regardless of the number of objects to be located and regardless of the nature of these objects, the generalization of the described embodiments also falling within the scope of the invention.

FIG. 1 schematically shows, in its environment and according to certain embodiments of the invention, a system 10 for locating an object MD.

The locating system 10 of FIG. 1 comprises a locating device referred to as "tracer" TRA in the rest of the description and configured to perform processing operations for locating the object MD by implementing a locating method according to certain embodiments of the invention. The technical details relating to the hardware configuration of said tracer TRA and to the locating method implemented thereby, within the scope of the embodiments of FIG. 1, are described in more detail later.

The system 10 also comprises a communication device T configured to receive a backscattered signal and transmit a location datum P, by implementing a communication method according to certain embodiments of the invention. The technical details relating to the hardware configuration of said communication device T and to the communication method implemented thereby, within the scope of the embodiments of FIG. 1, are described in more detail later.

As illustrated by FIG. 1, the locating system 10 is placed in an environment comprising a transmitter device S configured to transmit, at a transmission frequency F_E contained within a given frequency band referred to as "transmission band", a radio signal referred to as "ambient signal" S_AMB. The ambient signal S_AMB may be transmitted for example at all times or else recurrently.

For the rest of the description, in the embodiments illustrated by FIG. 1, consideration will be given, in a completely non-limiting manner, to the case where the ambient signal S_AMB is only transmitted by a single transmitter device S. The choice to consider a single transmitter device is made here solely for the purpose of simplifying the description. Therefore, there is no limit attached to the number of transmitter devices able to be considered within the scope of the present invention, the following developments in fact being able to be applied generally without difficulty by a person skilled in the art to the case of a plurality of transmitter devices.

"Radio signal" refers here to an electromagnetic wave propagating by wireless means, the frequencies of which are contained within the traditional spectrum of radio waves (a few hertz to several hundred gigahertz).

By way of completely non-limiting example, the ambient signal S_AMB is a 4G mobile telephony signal transmitted within the transmission band [811 MHz, 821 MHz] by the transmitter device S. It should however be specified that certain embodiments of the invention may be applied to other types of radio signals, such as for example a mobile telephony signal other than 4G (for example 2G, 3G, 5G at 3.5 GHz, 5G at 700 MHz, etc.), a Wi-Fi signal, a WiMax signal, a DVB-T signal, or a combination of such signals. In general, there is no limit attached to the ambient radio signal able to be considered within the scope of the embodiments of the present invention. Consequently, it should be noted that the number of antennas fitted to the transmitter device S does not constitute a limiting factor of the invention.

Within the scope of the example illustrated in FIG. 1, it is considered that the ambient signal S_AMB is transmitted on a downlink between the transmitter device S and the communication device T. The communication device T is thereby served by the transmitter device S by way of the ambient signal S_AMB. It therefore becomes apparent from these provisions that the transmitter device S and the communication device T may be considered to be two devices of a communication system in which the communication device T plays the role of "receiver device" receiving the ambient signal S_AMB, but also a signal backscattered from said signal S_AMB, as detailed below.

For the rest of the description of the embodiments of FIG. 1, it will be considered that the transmitter device S is a base station and that the receiver device T is a smartphone mobile terminal belonging to a user. Said user may be a person who does not belong to a workforce dedicated to implementing logistics processes. Typically, he/she is a member of the public moving near the object MD, such as for example a consumer moving through the point of sale at which the object MD is situated.

It should however be noted that there is no limit attached to the form taken by the transmitter device S and the receiver device T, provided that they are able to communicate with one another within a wireless communication network. Thus, according to another example, the transmitter device S may correspond to a Wi-Fi terminal and the receiver device T may correspond to a smartphone, or a touchscreen tablet, or a personal digital assistant, or even a personal computer, etc., able to communicate using the Wi-Fi protocol.

In certain embodiments of the locating method of the invention, the location datum P that the terminal T is able to transmit may be used by the tracer TRA. This location datum P is transported by a signal referred to as "location signal" S_LOC, and is representative of a location of the terminal T at the time when said location signal S_LOC is transmitted.

For example, said location datum P may be a GPS (acronym for "Global Positioning System") datum indicating the geographical coordinates of the terminal T.

However, there is nothing to rule out contemplating a location datum other than a GPS datum. For example, said location datum P may be an identifier attached to the communication cell to which the terminal T belongs from among all of the cells of the communication network via which said communication terminal T and the base station S communicate. Such an identifier refers for example to the geographical coordinates of the center of the communication cell that is attached thereto.

The environment in which the locating system 10 is located also comprises the object MD able to be located by way of said system 10. Said object MD is equipped with a wireless communication device, referred to as RF "transmitter device" (also called a "tag" in the literature), for example arranged fixedly on the surface of the object MD.

Said RF transmitter device is furthermore configured to transmit, to the terminal T, a signal S_RETRO through ambient backscatter of the ambient signal S_AMB.

In the embodiments illustrated, the ambient backscatter communication comprises the RF transmitter device utilizing the ambient signal S_AMB to send a message to said terminal T, here by way of said signal S_RETRO. In particular, said message may comprise an identification datum M of said RF transmitter device. Said identification datum M may comprise an identifier of the object MD, this identifier being for example a manufacturing number for distinguishing said object MD from similar objects in the case of mass production.

The identification datum M is transmitted for example by varying the backscattering of the ambient signal S_AMB, this variation being based on the possibility that the RF transmitter device has of modifying the impedance presented to an antenna fitted thereto (not shown in the figures), depending on the identification datum M to be transmitted.

In particular, the RF transmitter device may be associated with operating states depending on the impedance that is presented to the antenna with which it is equipped. For the rest of the description, it will be considered, without limitation, that these states are a state referred to as a "backscatter" state (the RF transmitter device is able to backscatter the signal S_AMB), and an opposing state referred to as a "non-backscatter" state (the RF transmitter device is not able to backscatter the signal S_AMB or, in other words, is "transparent" to the signal S_AMB). The impedance associated with the backscatter state corresponds for example to zero or infinite impedance, while the impedance associated with the non-backscatter state corresponds for example to the complex conjugate of the characteristic impedance of the antenna in the propagation medium under consideration and at the frequency under consideration.

It is important to note that the invention is not limited to this ideal case in which only two states, respectively perfectly backscattering and perfectly non-backscattering, would be considered. Indeed, certain embodiments of the invention may be applied in the case where two states (first state and second state) are not perfectly backscattering/non-backscattering, provided that the variation in the backscattered waves is perceptible to the terminal T that is intended to receive the identification datum M.

The identification datum M transmitted by the RF transmitter device to the terminal T, by way of the signal S_RETRO, may for example be encoded, in certain embodiments of the invention, by way of a set of symbols, comprising for example a symbol referred to as a "high" symbol with a first value (for example a bit or a set of bits with the value "1"), and/or a symbol referred to as a "low" symbol with a second value (for example a bit or a set of bits with the value "0"). The transmission of the identification datum M by varying the ambient backscatter may therefore be performed by alternating between said backscatter and non-backscatter states, each of said states being dedicated to the transmission of one of the symbols (for example high symbol for backscatter state and low symbol for non-backscatter state, or vice versa). In other words, the identification datum M transmitted by the RF transmitter device may be transported to the terminal T by modulating the waves of the ambient signal S_AMB (that is to say through back-modulation).

The processing operations aimed at backscattering said ambient signal S_AMB may for example be performed by the RF transmitter device by implementing a backscatter method (not shown in the figures). For this purpose, the RF transmitter device comprises for example one or more processors and storage means (magnetic hard disk, electronic memory, optical disk, etc.) in which it is possible to store data and a computer program, in the form of a set of program code instructions to be executed in order to implement said backscatter method.

As an alternative or in addition, the RF transmitter device may also comprise one or more programmable logic circuits, of FPGA, PLD, etc. type, and/or specialized integrated circuits (ASIC), and/or a set of discrete electronic components, etc. designed to implement the backscatter method.

In other words, the RF transmitter device may comprise a set of means configured as software (specific computer program) and/or hardware (FPGA, PLD, ASIC, etc.) for implementing the backscatter method.

In the embodiments illustrated in FIG. 1, the terminal T may be configured to perform processing operations aimed at decoding the backscattered signal S_RETRO, so as to obtain in particular the identification datum M of the RF transmitter device. Said identification datum M may be obtained, in certain embodiments, by implementing a decoding method (not shown in the figures).

For this purpose, the terminal T comprises for example one or more processors and storage means (magnetic hard disk, electronic memory, optical disk, etc.) in which are stored data and a computer program, in the form of a set of program code instructions to be executed in order to implement said decoding method.

As an alternative or in addition, the terminal T may comprise one or more programmable logic circuits, of FPGA, PLD, etc. type, and/or specialized integrated circuits (ASIC), and/or a set of discrete electronic components, etc. designed to implement the decoding method.

In other words, the terminal T may comprise a set of means configured as software (specific computer program) and/or hardware (FPGA, PLD, ASIC, etc.) for implementing the decoding method.

In certain embodiments, the signal processing for the ambient backscatter data transmission and the decoding of these data may implement various techniques, and in particular those detailed in the following document to which a person skilled in the art may refer: "Ambient Backscatter Communications: A Contemporary Survey", N. Van Huynh, D. Thai Hoang, X. Lu, D. Niyato, P. Wang, D. In Kim, IEEE Communications Surveys & Tutorials, vol. 20, no. 4, pp. 2889-2922, Fourthquarter 2018.

It will be noted that, with regard to ambient backscatter communication, the base station S, the terminal T, the tracer TRA and the RF transmitter device may be separate from one another. As illustrated by FIG. 1, the tracer TRA may also be integrated into the base station S in certain embodiments.

Although the backscatter signal S_RETRO (respectively the location signal S_LOC) has only been described up to now as comprising the identification datum M (respectively the location datum P), there is nothing to rule out contemplating this signal comprising further data.

Thus, according to one example, the backscatter signal S_RETRO may comprise, in addition to the identification datum M, a temporal datum representative of the time of backscattering of the ambient signal S_AMB (or representative of a time very close to this time).

According to another example, or else possibly in addition to the previous example, the location signal S_LOC may comprise, in addition to the location datum P, a temporal datum representative of the time of generation of a location datum P.

FIG. 2 schematically shows one example of a hardware architecture of the tracer TRA of FIG. 1.

As illustrated by FIG. 2, the tracer TRA may have the hardware architecture of a computer. The tracer TRA may thus comprise, in particular, at least one processor 1_TRA1, at least one random access memory 2_TRA1, at least one read-only memory 3_TRA1 and at least one non-volatile memory 4_TRA1. It also has at least one communication module 5_TRA1.

The read-only memory 3_TRA1 of the tracer TRA may constitute a recording medium, able to be read by the processor 1_TRA1 and on which there is recorded a computer program PROG_TRA1, comprising instructions for executing a locating method according to certain embodiments of the invention. The program PROG_TRA1 may for example define functional modules of the tracer TRA that are based on or control the abovementioned hardware elements 1_TRA1 to 5_TRA1 of the tracer TRA, and which comprise in particular:

a first obtainment module configured to obtain an identification datum (here the identification datum M of the object MD), a second obtainment module configured to obtain a location datum (here a location datum P of the terminal T), a determination module configured to determine a location of an object (here of the object MD) based on said identification datum M and location datum P.

Thus, when it executes the program PROG_TRA1, the processor 1_TRA1 of the tracer TRA may be configured to:

obtain an identification datum (here the identification datum M of the object MD), said identification datum M resulting from the backscatter of the ambient signal S_AMB, determine a location of an object (here of the object MD) based on said identification data M and a location datum (here a location datum P of the terminal T).

The communication module 5_TRA1 may in particular allow the tracer TRA to exchange data with another device, for example a receiver device receiving a backscattered signal (such as the terminal T) and/or the base station S (into which it is integrated according to the example of FIG. 1). For this purpose, the communication module 5_TRA1 comprises for example a computer data bus able to transmit digital data. In general, there is no limit attached to the communication interface used by the communication module 5_TRA1, which may be wired or wireless, and able to implement various communication protocols (Ethernet, Wi-Fi, Bluetooth, 3G, 4G, 5G, etc.) in order to exchange the abovementioned data. It should be noted that the communication module 5_TRA1 may integrate said first and second obtainment modules fitted to the tracer TRA.

FIG. 3 schematically shows one example of a hardware architecture of the terminal T of FIG. 1.

As illustrated by FIG. 3, the terminal T may have the hardware architecture of a computer. The terminal T may thus comprise, in particular, at least one processor 1_T, at least one random access memory 2_T, at least one read-only memory 3_T and at least one non-volatile memory 4_T. It also has at least one communication module 5_T.

The read-only memory 3_T of the terminal T may constitute a recording medium, able to be read by the processor 1_T and on which there is recorded a computer program PROG_T, comprising instructions for executing a communication method according to certain embodiments of the invention. The program PROG_T may for example define functional modules of the terminal T that are based on or control the abovementioned hardware elements 1_T to 5_T of the terminal T, and which comprise in particular:

an obtainment module configured to obtain an identification datum (here an identification datum M) of an object (here of the object MD), a transmission module configured to transmit said identification datum M of the object MD and a location datum (here an identification datum P of the terminal T) to the tracer TRA.

Thus, when it executes the program PROG_T, the processor 1_T of the terminal T may be configured to:

obtain an identification datum (here the identification datum M) of an object (here of the object MD), said identification datum M resulting from the backscatter of said ambient signal S_AMB, transmit said identification datum M of the object MD and a location datum (here a location datum P of the terminal T) to the tracer TRA.

FIG. 4 shows, in the form of a flowchart, some steps of the locating method according to certain embodiments of the invention, such as they may be implemented by the tracer TRA of FIG. 2.

For the rest of the description of the locating method, it will be considered, in a completely non-limiting manner, that:

the backscattered signal S_RETRO also comprises a temporal datum T_RETRO representative of a time of backscattering of the ambient signal S_AMB, the location signal S_LOC also comprising a temporal datum T_LOC representative of the time of generation of a location datum P.

As illustrated by FIG. 4, the locating method comprises a step E10 of obtaining the identification datum M of the object MD. This step E10 is for example implemented at least partially by the first obtainment module fitted to the tracer TRA.

Step E10 of obtaining the identification datum M may comprise, in certain embodiments, the tracer TRA receiving the identification datum M, for example via the communication module 5_TRA1.

For example, insofar as the signal S_RETRO is transmitted to the terminal T, another signal comprising said identification datum M may be transmitted by the terminal T to the base station S (the transmission of such another signal is considered here to be a step of the communication method according to the invention, implemented by the terminal T in the illustrated embodiment). This other signal may be received by the base station S, such that the identification datum M may be transferred to (and therefore obtained by) the tracer TRA, which is integrated into the base station S in the example of FIG. 1.

Similarly, the locating method also comprises a step E20 of obtaining a location datum P representative of the geographical location of the terminal T of the backscattered signal S_RETRO containing the identification datum M (for example the communication device 12 according to FIG. 1). This step E20 may be implemented at least partially by the second obtainment module fitted to the tracer TRA.

Said obtaining step E20 may comprise, in certain embodiments, receiving a location datum P representative of the geographical location of the terminal T receiving the backscattered signal S_RETRO containing the identification datum M. Thus, in the example illustrated by FIG. 1, the obtaining step E20 comprises the base station S receiving the signal S_LOC (the transmission of the signal S_LOC is considered here to be a step of the communication method according to the invention, implemented by the terminal T in the illustrated embodiment). Said signal S_LOC is received by the base station S, such that the location datum P may be transferred to (and therefore obtained by) the tracer TRA, which is integrated into the base station S.

It should be noted that, in certain modes of implementation, steps E10 and E20 may be considered to be two separate steps. However, there is nothing to rule out contemplating other modes of implementation in which steps E10 and E20 correspond to one and the same step, such that the terminal T jointly (for example simultaneously) obtains the identification datum M and the location datum P. For example, this may involve simultaneously receiving the signal comprising the identification datum M and the location signal S_LOC, or else, according to another example, receiving a single signal comprising both the identification datum M and the location datum P (for example when the location signal S_LOC includes said identification datum M) (it will be understood that, in this case, the communication method according to the invention, which may be implemented for example by the terminal T, comprises either two transmissions that are implemented simultaneously or non-simultaneously or a single transmission).

Moreover, if the identification datum M and the location datum P are not obtained simultaneously by the tracer TRA, there is no limit attached to the order in which these data are obtained. The identification datum M may thus be obtained before the location datum P, and vice versa.

At the end of steps E10 and E20, the tracer TRA is in possession of the identification datum M and the location datum P. Therefore, and as illustrated by FIG. 4, the locating method comprises a step E30 of determining a location of the object MD based on the identification datum M and the location datum P. This step E30 is implemented by the determination module fitted to the tracer TRA.

Since the location of the object MD is determined by the tracer TRA, it is denoted "TRACE_MD" in the rest of the description.

In certain modes of implementation, determining the location TRACE_MD of the object MD may comprise associating the identification datum M of the object MD with the location datum P of the terminal T. In other words, in such modes, and insofar as a single location datum P is obtained by the tracer TRA following the implementation of step E20, it is considered that the object MD occupies a position identical to that occupied by the terminal T, independently of (that is to say without taking into account) the temporal data T_RETRO and T_LOC respectively associated with the backscatter signal S_RETRO and location signal S_LOC. As a reminder, these temporal data are optional and may be omitted in certain embodiments of the invention.

According to another particular mode of implementation, determining the location TRACE_MD of the object MD may also take into account the temporal data T_RETRO and/or T_LOC.

For example, a time difference may be determined between the temporal data T_RETRO and T_LOC and, if said time difference is less than a first value (such as a constant threshold value, for example of between a few minutes and a few days, or a relative threshold value), it may be considered, in certain embodiments, that the object MD occupies a position identical to that occupied by the terminal T, as was the case in the modes of implementation described above. Imposing an upper bound on said time difference, via the use of the first value, may help to increase the reliability of the determined location TRACE_MD. Indeed, it will be understood that, if said time difference is very large (that is to say greater than the first fixed value), there is a risk of the communication device 12 occupying a position P far from that of the object MD when the location signal S_LOC is transmitted.

It will be noted that, if said time difference is greater than said first value, it may be considered that no location TRACE_MD of the object MD is able to be determined.

FIG. 5 shows, in the form of a flowchart, some steps of the communication method according to certain embodiments of the invention, such as they may be implemented by the terminal T of FIG. 3.

At least some of said steps of the communication method have already been mentioned above during the description of the locating method of FIG. 4. They are therefore recalled only briefly here.

Thus, as illustrated by FIG. 5, the communication method comprises a step F10 of obtaining the identification datum M of the object MD, said identification datum M resulting from the backscatter of the ambient signal S_AMB.

The communication method furthermore comprises a step F20 of obtaining a location datum P of the terminal T.

It will be recalled here that this step F20 may be subject, in certain modes of implementation, to two transmission sub-steps when the identification datum M and the location datum P are not transmitted by way of one and the same signal.

Finally, the communication method comprises a step F30 of transmitting the identification datum M and the location datum P of the terminal T to the tracer TRA.

In the case where the location TRACE_MD of the object MD is determined independently of the temporal data T_RETRO and T_LOC, said location TRACE_MD is for example stored in storage means of the tracer TRA and/or of the base station S in the form of a pair of data comprising the location datum P and the identification datum M, that is to say TRACE_MD=(P, M).

As a variant, said location TRACE_MD is for example stored in storage means of the tracer TRA and/or of the base station S in the form of an n-tuple of data comprising the location datum P, the identification datum M and at least one temporal datum, for example the temporal datum T_RETRO, the temporal datum T_LOC, a temporal datum representative of the time of obtainment of the identification datum and/or location datum, and/or a temporal datum representative of the time of determination of said location TRACE_MD (that is to say time of execution of step E30).

In the case where the location TRACE_MD of the object MD is determined taking into account the temporal data T_RETRO and T_LOC, said location TRACE_MD is for example stored in storage means of the tracer TRA and/or of the base station S. In particular, said storage is performed in the form of an n-tuple of data comprising the location datum P, the identification datum M and a temporal datum determined on the basis of the data T_RETRO and T_LOC. For example, in certain embodiments, the temporal datum contained in said n-tuple of data may be the datum T_RETRO. However, there is nothing to rule out contemplating the temporal datum contained in the n-tuple of data differing from T_RETRO, and being equal for example to T_LOC, or else to a temporal datum representative of a time between T_RETRO and T_LOC (for example: an average equal to $\frac{1}{2} \times (T\_RETRO+T\_LOC)$), or else to a temporal datum representative of the time of determination of said location TRACE_MD (that is to say time of execution of step E30).

It thus becomes apparent from the aspects that have just been described, in connection with the storage of a location TRACE_MD of the object MD, that the invention also covers a data collection device D_MEM. In the modes described above in connection with FIG. 1, the tracer TRA or else the base station S may play the role of this data collection device D_MEM. It will nevertheless be understood that it is also possible for a device separate from the tracer TRA and from the base station S to play the role of said data collection device, this other device therefore being configured to obtain the location TRACE_MD in question from the tracer TRA. It may be for example a server coupled to a database.

In general, the data collection device D_MEM has a hardware architecture such as that illustrated by FIG. 6 (it will be noted that the data collection device D_MEM is also illustrated in a completely non-limiting manner in FIG. 1, and in FIGS. 8 and 13 described later).

As illustrated by FIG. 6, the data collection device D_MEM may have the hardware architecture of a computer. The collection device D_MEM may thus comprise, in particular, at least one processor 1_MEM, at least one random access memory 2_MEM, at least one read-only memory 3_MEM and at least one non-volatile memory 4_MEM. It also has at least one communication module 5_MEM.

The read-only memory 3_MEM of the data collection device D_MEM may constitute a recording medium, able to be read by the processor 1_MEM and on which there is recorded a computer program PROG_MEM, comprising instructions for executing a data collection method according to certain embodiments of the invention. The program PROG_MEM may for example define functional modules of the data collection device D_MEM that are based on or control the abovementioned hardware elements 1_MEM to 5_MEM of the data collection device D_MEM, and which comprise in particular a data collection module configured to store at least one location TRACE_MD of the object MD as determined by the tracer TRA, said storage being for example performed in a file so as to constitute a location history of said at least one object.

Thus, when it executes the program PROG_MEM, the processor of the data collection device D_MEM may be configured to store at least one location TRACE_MD of the object MD as determined by the tracer TRA, said storage being performed in a file so as to constitute a location history of said at least one object.

It also becomes apparent from the above that the data collection method (illustrated for example in FIG. 14) implemented by the data collection device D_MEM comprises a step K10 of storing at least one location TRACE_MD of the object MD as determined by the tracer TRA, said storage being for example performed in a file so as to constitute a location history of said at least one object.

Said location history may comprise, in certain embodiments, n-tuples of data as mentioned above. These n-tuples may for example be ordered, in increasing or decreasing order, according to their temporal data. Such an embodiment may help to keep track of certain positions occupied by the object MD over time. Such a history may for example be useful if it has been identified that the object MD belongs to a batch of defective (or contaminated) products, to define a geographical area containing a person (consumer) or an entity (point of sale) likely to be (or to have been) in possession of said object MD and to warn them thereof.

It should be noted that, regardless of the mode of implementation under consideration (taking into account or not taking into account the temporal data T_RETRO and T_LOC in the determination of the location TRACE_MD of the object MD), determining the location TRACE_MD of the object MD may take into account a datum representative of a level of confidence for said location TRACE_MD.

A probability may for example be computed on the basis of the time difference between the temporal data T_RETRO and T_LOC, such that, the greater this time difference, the lower said probability (that is to say the confidence in the accuracy of the location TRACE_MD of the object MD is low).

According to another example, or else in combination with the previous one, said probability is computed so as to take into account a precision of the location datum P. Such precision typically depends on the way in which said location datum P is obtained. For example, the precision in question may be a characteristic precision of a GPS reading or even a precision implemented manually so as to take into account a margin of error (for example a radius in meters so as to define an area around a geographical coordinate, an area within which an object is likely to be located, etc.).

According to another example, it is possible to take into account a probability or a weighting coefficient, linked to a quality of one of the signals received by the base station S or by the tracer TRA.

Moreover, the locating method of FIG. 4 has been described up to now considering that the group of steps formed by steps E10, E20 and E30 were executed only once. However, the invention also covers the case where at least one step of this group is executed repeatedly.

Thus, in certain modes of implementation, steps E10, E20 and E30 of the locating method may be iterated recurrently, for example periodically.

Moreover, it is also possible to contemplate the tracer TRA being in possession of a plurality of location data transmitted by the terminal T at the time of execution of step E30. This may result for example from the fact that the location signal S_LOC is transmitted recurrently, for example periodically, by the terminal T. In this case, the expression "obtaining at least one identification datum", with reference to the implementation of said step E20, corresponds to obtaining at least one of the data from among said plurality of location data.

For example, the datum obtained following the implementation of step E20 is any one from among said plurality of location data.

According to another example, the location datum that is obtained may be the last location datum received from the terminal T, or be deduced from the location data received immediately before and immediately after obtaining the identification datum. In certain embodiments, the temporal data T_RETRO and T_LOC respectively contained in the backscatter signal S_RETRO and location signal S_LOC may be taken into account. For example, the datum obtained following the implementation of step E20 may be the one from among said plurality of location data whose associated temporal datum is closest in time to the temporal datum associated with the identification datum M obtained by the tracer TRA following the implementation of step E10.

Furthermore, it has also been considered up to now, and with regard to the embodiments in connection with FIG. 1, that the tracer TRA is integrated into the base station S. That being said, there is nothing to rule out contemplating, according to other embodiments, the tracer TRA being external to the base station S. In this case, the location datum P and the identification datum M may for example be transmitted directly by the terminal T to the tracer TRA. "Directly" refers here to the fact that said location datum P and identification datum M do not pass via the base station S before being obtained by the tracer TRA. As an alternative, even when the tracer TRA is external to the base station S, all or some of said data may be transmitted directly by the terminal T to the tracer TRA, the other data for their part passing via the base station S before being obtained by the tracer TRA. FIG. 7 illustrates, in a completely non-limiting manner, the case where the location datum P and the identification datum M pass via the base station S before being obtained by the tracer TRA, which is external to said base station S.

The invention as a whole has been described up to now in connection with the locating system 10 of FIG. 1, in which the ambient signal S_AMB is transmitted on a downlink between the base station S and the terminal T. However, the invention is not limited to such embodiments.

FIG. 8 schematically shows, in its environment and in accordance with the invention, a system 20 for locating an object MD according to other embodiments.

The embodiments of FIG. 8 differ in particular from the embodiments of FIG. 1 in that it is now considered that the ambient signal S_AMB is transmitted by the terminal T. In other words, the ambient signal S_AMB is transmitted on an uplink between the terminal T and the base station S. Consequently, and contrary to what has been described above in connection with the embodiments of FIG. 1, the base station S and the terminal T may be considered here to be two devices of a communication system, the terminal T playing the role of "transmitter device" with regard to the ambient signal S_AMB and the base station S henceforth playing the role of "receiver device" receiving the backscattered signal (and therefore the data relating to the identification of the object MD).

It therefore becomes apparent from these provisions that, in the embodiments illustrated in FIG. 8, the RF transmitter device may be configured to transmit the signal S_RETRO to the base station S through ambient backscatter of the ambient signal S_AMB transmitted by the terminal T.

Therefore, in the embodiments illustrated in FIG. 8, the base station S may in particular be configured to perform processing operations aimed at decoding the backscattered signal S_RETRO, so as to obtain the identification datum M of the RF transmitter device contained in the signal S_RETRO. Said identification datum M is obtained for example by implementing a decoding method (not shown in the figures).

The base station S comprises for example one or more processors and storage means (magnetic hard disk, electronic memory, optical disk, etc.) in which it is possible to store data and a computer program, in the form of a set of program code instructions to be executed in order to implement said decoding method.

As an alternative or in addition, the base station S may also comprise one or more programmable logic circuits, of FPGA, PLD, etc. type, and/or specialized integrated circuits (ASIC), and/or a set of discrete electronic components, etc. designed to implement the decoding method.

In other words, the base station S may comprise a set of means configured as software (specific computer program) and/or hardware (FPGA, PLD, ASIC, etc.) for implementing the decoding method.

A description has been given above, in connection with FIG. 1, of some embodiments comprising obtaining a location datum of a receiver device receiving the backscattered signal on a downlink. It should be noted, however, that some embodiments in connection with FIG. 8 may comprise obtaining at least one location datum of the transmitter device transmitting the ambient signal S_AMB on an uplink, that is to say the terminal T illustrated in FIG. 8.

It will moreover be noted that, insofar as it is the base station S that is now the receiver of the backscattered signal, certain embodiments of the communication method according to the invention may be implemented by the base station S.

Apart from these aspects, the technical features described above in connection with the locating system 10 and the elements contained in the environment thereof, and technically applicable within the scope of the embodiments of FIG. 8, are adopted again here, it being understood that the obtainment of identification data of the object MD is obtained here from the base station S, and the location data relating to the terminal T transmitting the ambient signal are obtained by the tracer TRA directly or indirectly (for example via the station).

For the rest of the description, and first of all, it will be considered, in a completely non-limiting manner (and as had been done for the system 10 of FIG. 1), that the tracer TRA is integrated into the base station S.

FIG. 9 schematically shows one example of a hardware architecture of the tracer TRA of FIG. 8.

As illustrated by FIG. 9, the tracer TRA may for example have the hardware architecture of a computer. The tracer TRA may thus comprise, in particular, at least one processor 1_TRA2, at least one random access memory 2_TRA2, at least one read-only memory 3_TRA2 and at least one non-volatile memory 4_TRA2. It may also have at least one communication module 5_TRA2.

The read-only memory 3_TRA2 of the tracer TRA constitutes a recording medium, able to be read by the processor 1_TRA2 and on which there may be recorded a computer program PROG_TRA2, comprising instructions for executing steps of a locating method according to certain embodiments of the invention. The program PROG_TRA2 defines for example functional modules of the tracer TRA that are based on or control the abovementioned hardware elements 1_TRA2 to 5_TRA2 of the tracer TRA, and which comprise in particular:

a first obtainment module configured to obtain an identification datum (here the identification datum M of the object MD), a second obtainment module configured to obtain a location datum (here a location datum P of the terminal T), a determination module configured to determine a location of an object (here of the object MD) based on said identification datum M and location datum P.

Thus, when it executes the program PROG_TRA2, the processor 1_TRA2 of the tracer TRA may be configured to:

obtain an identification datum (here an identification datum M of the object MD), said identification datum M resulting from the backscatter of the ambient signal S_AMB, determine a location of an object (here of the object MD) based on said identification datum M and a location datum (here a location datum P of the terminal T).

The communication module 5_TRA2 in particular allows the tracer TRA to exchange data with another device, for example a transmitter device transmitting a backscattered signal (such as the terminal T) and/or the base station S (into which it is integrated according to the example of FIG. 8). For this purpose, the communication module 5_TRA2 comprises for example a computer data bus able to transmit digital data. In general, there is no limit attached to the communication interface used by the communication module 5_TRA2, which may be wired or wireless, and able to implement various communication protocols (Ethernet, Wi-Fi, Bluetooth, 3G, 4G, 5G, etc.) in order to exchange the abovementioned data. It should be noted that the communication module 5_TRA2 may integrate said first and second obtainment modules fitted to the tracer TRA.

FIG. 10 schematically shows one example of a hardware architecture of the base station S of FIG. 8.

As illustrated by FIG. 10, the base station S may have the hardware architecture of a computer. The base station S may thus comprise, in particular, at least one processor 1_S, at least one random access memory 2_S, at least one read-only memory 3_S and at least one non-volatile memory 4_S. It also has at least one communication module 5_S.

The read-only memory 3_S of the base station S may constitute a recording medium, able to be read by the processor 1_S and on which there is recorded a computer program PROG_S, comprising instructions for executing a communication method according to certain embodiments of the invention. The program PROG_S may for example define functional modules of the base station S that are based on or control the abovementioned hardware elements 1_S to 5_S of the base station S, and which comprise in particular:

an obtainment module configured to obtain an identification datum (here an identification datum M) of an object (here of the object MD), a transmission module configured to transmit said identification datum M of the object MD and a location datum (here a location datum P of the terminal T) to the tracer TRA.

Thus, when it executes the program PROG_S, the processor 1_S of the base station S may be configured to:

obtain an identification datum (here an identification datum M) of an object (here of the object MD), said identification datum M resulting from the backscatter of said ambient signal S_AMB, transmit said identification datum M of the object MD and a location datum (here a location datum P of the terminal T) to the tracer TRA.

FIG. 11 shows, in the form of a flowchart, some steps of the locating method according to certain embodiments of the invention, such as they may be implemented by the tracer TRA of FIG. 9.

For the rest of the description of the locating method, it will be considered, in a completely non-limiting manner, that:

the backscattered signal S_RETRO also comprises a temporal datum T_RETRO representative of a time of backscattering of the ambient signal S_AMB, the location signal S_LOC also comprising a temporal datum T_LOC representative of the time of generation of a location datum P.

As illustrated by FIG. 11, the locating method comprises a step G10 of obtaining the identification datum M of the object MD. This step G10 is for example implemented at least partially by the first obtainment module fitted to the tracer TRA.

It will be noted that, unlike what was described above for the locating method of FIG. 4, the backscatter signal S_RETRO is received directly or indirectly here by the base station S (the obtainment of the identification datum M, with a view to transferring it to the tracer TRA, is considered here to be a step of the communication method according to the invention, implemented by the base station S).

"Received directly" refers here to the fact that the signal S_RETRO is not intercepted between the RF transmitter device and the base station S, where, in the case of the embodiments in connection with FIG. 1, said signal S_RETRO was first of all received by the terminal T in order then to transmit the identification datum M to the tracer TRA (possibly via the source SO).

Thus, at the end of step G10, the tracer TRA is in possession of the identification datum M of the object MD.

The locating method of FIG. 11 also comprises a step G20 of obtaining the location datum P of the terminal T. This step G20 is for example implemented at least partially by the second obtainment module fitted to the tracer TRA.

Said obtaining step G20 follows the transmission, by the terminal T, of the signal S_LOC to the base station S. Said signal S_LOC is received by the base station S, such that the location datum P is able to be transferred to (and therefore obtained by) the tracer TRA, which is integrated into the transmitting source SO (the transmission of the location datum P by the base station S to the tracer TRA is considered here to be a step of the communication method according to the invention).

It should be noted that, in certain modes of implementation, steps G10 and G20 are two separate steps. However, there is nothing to rule out contemplating other modes of implementation in which said steps G10 and G20 correspond to one and the same step, such that the tracer TRA jointly (for example simultaneously) obtains the identification datum M and the location datum P, in a manner similar to what has been described above in connection with the embodiments of FIG. 1.

Moreover, if the identification datum M and the location datum P are not obtained simultaneously by the tracer TRA, there is no limit attached to the order in which these data are obtained. The identification datum M may thus be obtained before the location datum P, and vice versa.

At the end of steps G10 and G20, the tracer TRA is in possession of the identification datum M and the location datum P. Therefore, and as illustrated by FIG. 10, the locating method comprises a step G30 of determining a location TRACE_MD of the object MD based on the identification datum M and the location datum P. This step G30 is implemented by the determination module fitted to the tracer TRA.

The implementation of step G30 is identical to that of step E30 described above with reference to FIG. 4.

FIG. 12 shows, in the form of a flowchart, some steps of the communication method according to certain embodiments of the invention, such as they may be implemented by the base station S of FIG. 10.

At least some of said steps of the communication method have already been mentioned above during the description of the locating method of FIG. 11. They are therefore recalled only briefly here.

Thus, as illustrated by FIG. 12, the communication method comprises a step H10 of obtaining the identification datum M of the object MD, said identification datum M resulting from the backscatter of the ambient signal S_AMB.

The communication method furthermore comprises a step H20 of obtaining a location datum P of the terminal T. In a manner similar to what was described above for steps G10 and G20 of the locating method of FIG. 11, said step H20 may be implemented such that the identification datum M and the location datum P are received simultaneously or non-simultaneously by the base station S.

Finally, the communication method comprises a step H30 of transmitting said identification datum M and location datum P from the base station S to the tracer TRA.

It should be noted that the location TRACE_MD, determined by the tracer TRA according to the locating method of FIG. 11, may also be subject, in certain embodiments, to storage in a file so as to constitute a location history of the object MD. To this end, the aspects described above with regard to the use of a data collection device (FIG. 6) and the implementation of a data collection method implemented by said data collection device are still applicable to the embodiments in connection with the system 20 of FIG. 8.

It has also been considered up to now, with regard to the embodiments in connection with FIG. 8, that the tracer TRA is integrated into the base station S. That being said, there is nothing to rule out contemplating, according to other embodiments, the tracer TRA being external to the base station S. In this case, the location datum P and the identification datum M are first of all received by the base station S, which transmits them to the tracer TRA. In a completely non-limiting manner, the location datum P and the identification datum M pass via the base station S before being obtained by the tracer TRA, which is external to said base station S.

It is furthermore also possible to contemplate, in certain embodiments in connection with FIG. 8 and when the tracer TRA is external to the base station S:

said base station S receiving, from the RF transmitter device (and therefore from the object MD), the identification datum M of said object MD through backscatter of the ambient signal S_AMB;

the tracer TRA receiving directly, from the terminal T, the location datum P of said terminal T.

In other words, in these embodiments, only the identification datum M passes via the base station S before being transferred to the tracer TRA.

The invention has furthermore also been described up to now considering that the locating system 10, 20 comprises only a single communication device T (FIG. 1 and FIG. 8). Considering a single communication device T however constitutes only one variant embodiment of the invention.

It is thus also possible to contemplate a plurality of location data being obtained by the tracer TRA, said location data having been transmitted by a plurality of communication devices (in this case, these are "transmitter" devices if it is considered that an ambient signal is transmitted on an uplink, or else "receiver" devices if it is considered that an ambient signal is transmitted on a downlink, or even a combination of transmitter and receiver devices). Determining a location of the object MD may therefore comprise for example:

determining an adjusted location datum, based on said plurality of location data, associating the identification datum of said at least one object with said adjusted location datum.

By way of completely non-limiting example, the adjusted location datum may be determined through triangulation between the location data (this therefore involves pooling a plurality of location data).

However, there is nothing to rule out considering the adjusted location datum being determined in a manner other than by triangulation. For example, a location datum is selected at random from among said plurality of location data to be said adjusted location datum.

Of course, the invention as described above may also be applied generally to the case where multiple objects positioned in the environment of the locating system 10, 20 are each equipped with a transmitter device able to backscatter an ambient signal so as to generate a backscatter signal at least carrying an identification datum of the object to which said transmitter device is attached.

One exemplary embodiment of the invention is shown in FIG. 13. In this example, the locating system comprises a plurality of objects MD_1, MD_2, MD_3 respectively equipped with transmitter devices RF_1, RF_2, RF_3. It also comprises a plurality of terminals T_E1, T_E2 each configured to transmit an ambient signal able to be backscattered by the transmitter devices RF_1, RF_2, RF_3 toward the base station S. The locating system furthermore comprises a plurality of terminals T_R1, T_R2, T_R3, T_R4 configured to receive and decode a backscattered signal resulting from the backscattering, by the transmitter devices RF_1, RF_2, RF_3, of an ambient signal transmitted by the base station S. The locating system of FIG. 13 also comprises a tracer TRA integrated into the base station S and a data collection device D_MEM.

It is important to note that the invention is not limited to locating one or more objects equipped with transmitter devices able to backscatter one or more ambient signals so as to transmit identification data of said objects.

Indeed, in certain embodiments, the invention may make it possible to locate at least one object referred to as "other object" based on a location of at least one object as determined by the tracer TRA.

The rest of the description, in a completely non-limiting manner, targets the case where a single other object MC is able to be located, on the basis of the location of a single object MD as determined in accordance with the embodiments described above (said object MC is illustrated by way of example in FIG. 7). Of course, and as was already the case with regard to the location of objects equipped with respective transmitter devices, there is no limit attached to the number of other objects (that is to say objects not equipped with respective transmitter devices) able to be located by way of the invention.

Furthermore, for the rest of the description, and in order to simplify it, it will be considered, in a completely non-limiting manner, that the entity able to locate said other object MC is also the tracer TRA. For this purpose, the tracer TRA also comprises a determination module (for example separate from the determination module able to determine a location of the object MD) configured to determine a location of said other object MC taking into account a neighborhood of said located object MD and of said at least one other object MC.

Thus, when it executes the program PROG_TRA1, the processor 1_TRA1 of the tracer TRA may be configured to determine a location of said other object MC taking into account a neighborhood of said located object MD and of said at least one other object MC.

It will however be noted that the invention is not limited by such provisions. There is thus nothing to rule out contemplating, according to other embodiments, a locating device for locating said other object MC being included in the locating system while being separate from the tracer TRA. In this case, said locating device separate from the tracer TRA has a hardware architecture similar to that described above for the tracer TRA with reference to FIGS. 2 and 9.

Regardless of the mode of implementation described above, and to help to locate said other object MC, the locating method according to the invention may furthermore comprise a step of determining a location TRACE_MC of said other object MC (step denoted E40 in FIG. 4 and G40 in FIG. 11) taking into account a neighborhood V of said located object MD and of said at least one other object MC.

In certain embodiments, said neighborhood V is a past and/or scheduled geographic proximity of said at least one located object MD and of said other object MC. It may also be a past and/or scheduled geographic proximity during a first time period. For example, said first time period may refer to a design or storage or transport phase of said objects MD, MC. It will of course be understood that considering such an exemplary implementation is particularly relevant in the case of mass-produced objects sold in batches.

In practice, said neighborhood V may be taken into account by evaluating a neighborhood criterion CR_V that makes it possible at least to check whether the object MD and said other object MC have been positioned close to one another before the implementation of said evaluation of the neighborhood criterion CR_V and/or whether it is scheduled for these objects MD, MC to be positioned close to one another.

Therefore, if the neighborhood criterion CR_V is satisfied, the location TRACE_MC of said other object MC is considered to be at least close to that of the object MD. In a more specific exemplary implementation, the location TRACE_MC of said other object MC is considered to be equal to that of the object MD. In other words, in this more specific example, and if it has been determined that the location of the object MD is TRACE_MD=(t, P, MD) (t corresponding to temporal information that, as a reminder, is only optional), the location of the other object MC is TRACE_MC=(t, P, MC).

In a manner similar to what was described above for the object MD, the location TRACE_MC of the object MC may also be determined so as to take into account a level of confidence in the accuracy of said location TRACE_MC. To this end, a probability representative of a level of confidence in the accuracy of said location TRACE_MC may be computed. The probability attached to the location TRACE_MC depends for example on a probability attached to the location TRACE_MD of the object MD.

In general, there is no limit attached to the definition of said neighborhood criterion CR_V, provided that it makes it possible at least to determine whether the objects OBJ and OBJ_BIS were neighbors of one another in the past and/or whether it is scheduled for these objects MD, MC to be positioned close to one another. Indeed, the purpose of using such a neighborhood criterion CR_V is at least to ensure that there has been and/or that there will be a proximity link between the object MD and the other object OBJ_BIS.

In order to evaluate said neighborhood (that is to say proximity) criterion CR_V, the tracer TRA may for example have access to information stored in a database (for example in a server BDD acting as database). Said information is for example contained at least partly in one or more traceability event histories recorded during one or more logistics processes for said objects MD and MC.

In certain embodiments, the neighborhood criterion CR_V may be defined a posteriori, on the basis of new information, or of an information update, according to which the objects MD and MC were neighbors of one another in the past. For example, such an exemplary implementation may be used within the context of a health alert or a batch recall, to reconstruct the path of potentially defective or contaminated objects OBJ_BIS forming part of the same production batch as the object MD, or potentially contaminated by OBJ.

As mentioned above, said one or more traceability event histories to which the tracer TRA may have access may be subject to various standards, such as for example EDIFACT, WMS, ERP, GS1 EPCIS.

Even more specifically, said information to which the tracer TRA may have access relates for example to information about a common group of products (group with identifier) to which the objects OBJ and OBJ_BIS belonged or are supposed to belong (Common transport: boat, plane, Common transport: truck, maritime container identified by GIAI (Global Individual Asset Identifier) or GRAI=Corporate Asset (Global Returnable Asset Identifier), Common shipping unit such as for example film-wrapped pallet identified by SSCC (Serial Shipping Container Code), Common packaging unit such as for example Box identified by GTIN (General Trade Item Number=13-digit barcode) or Spacer (cardboard pallet) identified by GIAI/GRAI or Reusable wooden pallet or container (plastic crate) identified by GRAI).

It will be noted that the invention has been described considering exemplary embodiments in which the transmitter device or the receiver device were able to be in particular (depending on whether one is in the case of an uplink or downlink) a smartphone or a base station. These examples do not limit the invention, and it is possible to contemplate, in certain embodiments of the invention, said locating, communication and/or collection device being an element of a group comprising at least:

a smartphone;

a mobile terminal;

a base station;

a server;

a network interconnection gateway.

Although the present disclosure has been described with reference to one or more examples, workers skilled in the art will recognize that changes may be made in form and detail without departing from the scope of the disclosure and/or the appended claims.

The invention claimed is:

1. A method implemented by an object-locating device and comprising:

obtaining at least one identification datum of at least one object, said at least one identification datum resulting from a backscatter of at least one ambient signal;

determining a location of said at least one object based on said at least one identification datum and at least one first location datum of at least one transmitter device of said at least one ambient signal and/or at least one receiver device of said at least one ambient signal.

2. The method of claim 1, wherein a plurality of first location data is obtained, said first location data having been transmitted by one or more transmitter devices if said at least one ambient signal is transmitted on at least one uplink or else by one or more receiver devices if said at least one ambient signal is transmitted on at least one downlink, determining a location of said at least one object comprising:

associating the identification datum of said at least one object with a second location datum obtained based on said plurality of first location data.

3. The method of claim 2, wherein the second location datum is determined through triangulation between the first location data.

4. The method of claim 1, wherein the method comprises:

obtaining at least one first temporal datum representative of the time of backscattering of said at least one ambient signal, obtaining at least one second temporal datum representative of the time of generation of said at least one location datum, determining the location of said at least one object taking into account said first and second temporal data.

5. The method of claim 1, wherein determining the location of said at least one object takes into account a datum representative of a level of confidence in an accuracy of said location.

6. A method, implemented in a receiver device, comprising:

receiving a backscattered ambient signal;

obtaining at least one identification datum of at least one object, said at least one identification datum resulting from the backscatter of said ambient signal; and transmitting said at least one identification datum of said at least one object to an object-locating device.

7. The method as claimed in claim 6, said method furthermore comprising, in response to said ambient signal is transmitted on an uplink between a transmitter device and said receiver device, transmitting at least one first location datum of said transmitter device to said object-locating device.

8. The method as claimed in claim 1, said method furthermore comprising:

storing, in a non-transitory storage medium able to be read by a computer, the location determined for the at least one object so as to create and/or enrich a location history of said at least one object.

9. The method as claimed in claim 1, said method furthermore comprising:

determining a location of at least one other object taking into account a neighborhood of said at least one located object and of said at least one other object.

10. The method as claimed in claim 9, wherein said neighborhood is a past and/or scheduled geographic proximity of said at least one located object and of said at least one other object.

11. A non-transitory computer readable storage medium comprising instructions stored thereon for implementing a method as claimed in claim 1 when said computer program is executed by a computer.

12. An object-locating device comprising at least one processor configured to:

obtain at least one identification datum of at least one object, said at least one identification datum resulting from a backscatter of at least one ambient signal; and determine a location of said at least one object based on said at least one identification datum and at least one location datum of said at least one transmitter device of said at least one ambient signal and/or at least one receiver device of said at least one ambient signal.

13. A communication device configured to receive a backscattered ambient signal, referred to as "receiver device", said receiver device comprising at least one processor configured to:

obtain at least one identification datum of at least one object, said at least one identification datum resulting from a backscatter of said ambient signal; and transmit said at least one identification datum of said at least one object to an object-locating device.

14. The object-locating device as claimed in claim 12, for locating at least one object referred to as "other object" based on the location of the at least one object as determined in claim 1, wherein:

the at least one processor is further configured to determine a location of said at least one other object taking into account a neighborhood of said at least one located object and of said at least one other object.

15. The object-locating device as claimed in claim 12, wherein:

the at least one processor is further configured to store at least one location determined for at least one object by a locating device as claimed in claim 14, said storage being performed in one or more files so as to constitute a location history of said at least one object.

16. The method of claim 1 comprising:

in response to said at least one ambient signal being transmitted on at least one uplink between said at least one transmitter device and said at least one receiver device, determining said location of said at least one object is based on said at least one identification datum and at least one first location datum of said at least one transmitter device.

17. The method of claim 1 comprising:

in response to said at least one ambient signal being transmitted on at least one downlink between said at least one transmitter device and said at least one receiver device, determining said location of said at least one object is based on said at least one identification datum and at least one first location datum of said at least one receiver device.

18. The method of claim 6 comprising:

in response to said ambient signal being transmitted on a downlink between a transmitter device and said receiver device, transmitting at least one location datum of said receiver device to said object-locating device.

19. A non-transitory computer readable storage medium comprising instructions stored thereon for implementing the communication method of claim 6 when said computer program is executed by a computer of the receiving device.

20. A method, to be performed in an electronic device comprising:

receiving a location of an object identified by at least one identification datum resulting from a backscatter of at least one ambient signal; and determining a location of at least one other object taking into account a neighborhood of said at least one located object and of said at least one other object.

* * * * *